April 14, 1959 R. F. McMAHAN, SR 2,881,997
CLAMP FOR SUPPORTING CASINGS AND THE LIKE
Filed Jan. 7, 1957

INVENTOR
ROY F. McMAHAN, SR.

BY W. E. Sherwood
ATTORNEY

United States Patent Office 2,881,997
Patented Apr. 14, 1959

2,881,997

CLAMP FOR SUPPORTING CASINGS AND THE LIKE

Roy F. McMahan, Sr., Louisville, Ky.

Application January 7, 1957, Serial No. 632,869

1 Claim. (Cl. 248—56)

This invention relates generally to an improved clamp for supporting uniformly shaped members such as pipes or rods and, more particularly, to a clamp arrangement for supporting an oil well casing. While the invention is disclosed in connection with a particular heavy duty usage, it will be understood that it is equally well adapted for light duty employment, as for example, in pipe hangers and supports.

One object of the invention is to provide an improved clamp comprising two symmetrical and interchangeable clamping elements.

Another object is to provide an improved clamp having load supporting portions formed integrally with the clamp elements.

Another object is to provide an improved clamp having load supporting portions disposed closely adjacent the supported member.

Another object is to provide an improved bolted clamp having recessed seats for the bolt heads.

A further object is to provide an improved clamp which employs less material than conventional clamps; which may be readily assembled or disassembled; and which provides a compact mounting.

A still further object is to provide an improved oil well casing clamping arrangement.

Other objects and advantages will become apparent when the following description is considered in conjunction with the accompanying drawings showing a presently preferred form of clamp.

In accordance with my invention, I provide a clamp comprising two symmetrical and interchangeable elements, each having a central portion for closely engaging the member to be supported, and two lateral extensions, the second of which engages the other clamp element and the first of which is mounted upon a suitable support.

Figure 1:
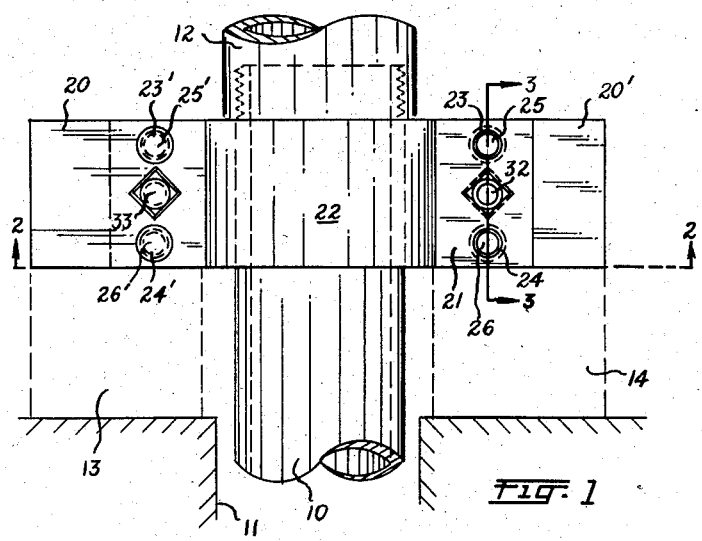
Fig. 1 is a diagrammatic view showing my invention as employed with an oil well casing.

Considering now Fig. 1, a typical heavy duty usage of the invention is shown in connection with oil well work wherein an elongated casing 10 normally held by an overhead derrick (not shown) is positioned in the bore 11 prior to the introduction of concrete or the like, into the pipe for supporting the lower end of the casing at the bottom of the bore. At its upper end, the casing is provided with an enlarged collar or coupling 12 adapted to rest upon the upper surface of the clamp which in turn rests upon massive sills 13 and 14 adjacent the surface of the ground. As a feature of my clamp, the sills may be positioned closely adjacent the bore 11 since the lateral extensions of the clamp need not be as long as those of conventional clamps which have a plurality of longitudinally spaced bolts.

Figure 2:
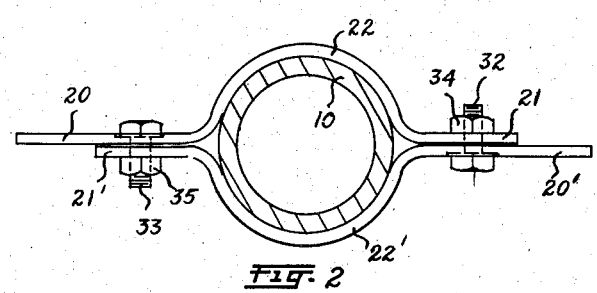
Fig. 2 is a plan view taken on line 2—2 of Fig. 1 and looking upwardly.

As seen in Fig. 2, the clamp, which preferably is of a metal having a suitable tensile and compressive strength, comprises two symmetrical elements having first or longer extensions 20 and $20^1$, second or shorter extensions 21 and $21^1$, and central portions 22 and $22^1$. These central portions are shaped to encompass closely the member to be supported and to provide a seat upon which the coupling 12 may rest. As shown herein, the casing and coupling are cylindrical and the central portions thus are shown as arcuate. However, in its broader aspects, my clamp may be employed to support a member having any other symmetrical geometric cross section, and I do not necessarily limit the central portions to an arcuate shape.

Figure 3:
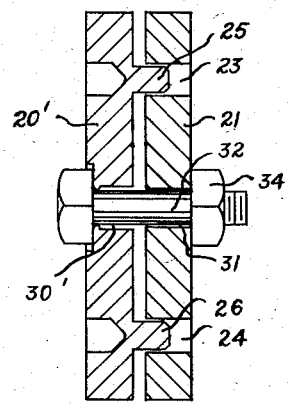
Fig. 3 is a view partly in section taken on line 3—3 of Fig. 1 and to an enlarged scale.

As best shown in Figs. 1 and 3, the shorter extensions 21 and $21^1$ are respectively provided with vertically aligned holes 23, $23^1$ and 24, $24^1$ for receiving with a close fit the load supporting projections or lugs 25, $25^1$ and 26, $26^1$ forming a part of the cooperating clamp element extensions 20 and $20^1$. The holes and projections are symmetrically spaced from the upper and lower edges of the clamp elements, thus providing for reversibility of those elements. It will be understood that dimensions of the clamp elements will be chosen in accordance with the loading to be expected, but in general, each element is relatively narrow in the direction of the axis of the holes and projections, and relatively broad in the direction of load application. The overall length of the extensions 20 and $20^1$ is such as to provide an adequate mounting surface. While I have shown only two load supporting projections on each clamp element, any suitable even number of the same may be employed consistent with the size of those elements. I prefer to extrude the projections from the material of the extensions 20 and $20^1$ to provide an integral projection, as shown. However, in its broader aspects, a welded projection or equivalent projection rigidly affixed to those extensions may be employed.

Along the center line of the clamp elements, enlarged bolt holes are provided in the respective clamp extensions, two such holes being shown at $30^1$ and 31, and in which bolts 32 and 33 having nuts 34 and 35 are mounted. It will be understood that these bolts essentially serve to position the respective clamp elements and to pull the projections into load-supporting relation, in contrast with previous clamps of this type in which the bolts themselves serve to support the load. Accordingly, smaller bolts may be used.

Figure 4:
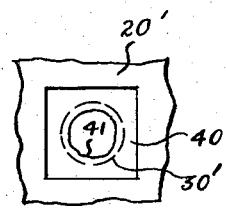
Fig. 4 is a detail side view to an enlarged scale of a portion of the clamp through which a bolt is adapted to extend, the bolt being omitted from the view.

Each bolt preferably is provided with an angular shaped head, here shown as a square head, and for convenience in assembly a recess is provided in each of the extensions 20 and $20^1$ for seating the bolt head and for restraining it against turning during such assembly. Referring now to Fig. 4, such a recess is shown at 40 in which the recess is formed by extrusion, the displaced metal 41 flowing into the enlarged bolt hole $30^1$ shown in dotted lines, which hole, however, still provides sufficient space for the shank of the bolt. The recess is made deep enough to insure a firm anchor for the bolt head, but not sufficiently deep to block entry of the bolt into hole $30^1$ by the metal so displaced.

With the foregoing description in mind, it will be seen that the load bearing projections lie in a plane parallel to the axis of the casing and adjacent the outer surface of the supported casing, and that each such projection preferably is of the same size and is subjected to substantially the same loading. A compact clamp assembly thus is provided and the two extensions of each clamp element may be of unequal length, thus saving in cost and material in contrast to conventional clamps in which such extensions are of equal length. The diameter of the load supporting projections may be of any selected value depending upon the load expected and upon the dimensions of the clamp elements along the axis of the supported member. Moreover, the arrangement of cylindrically shaped projections seating in cylindrical holes permits those projections to sustain the load equally well when applied in any radial direction, as for example when a horizontally disposed pipe is suspended by the clamp serving as a pipe hanger.

As a result of forming the clamp from two identical elements, the usual difficulties in stocking right and left hand parts and having a pair of nonsymmetrical elements available at the time when needed, is obviated.

While I have shown particular embodiments of my invention, it is understood, of course, that I do not wish to be limited thereto since many modifications can be made; and I, therefore, contemplate by the appended claim to cover any such modifications as fall within the true spirit and scope of my invention.

What I claim as new and desired to secure by Letters Patent of the United States is:

In a clamp for supporting a vertical pipe casing or the like having an enlarged coupling thereon, and comprising two substantially similar clamp elements each having integrally therewith a first extension laterally of said pipe casing for engagement with a separate support spaced from the casing, a second and shorter extension laterally of said pipe casing for engagement with the other clamp element, and a central portion intermediate said extensions for encircling engagement with said pipe casing and upon which said coupling rests; the improvement comprising a plurality of spaced holes formed in each of said shorter extensions, said holes being symmetrically spaced from the lower and upper edges of said shorter extensions and disposed in parallel relation to the axis of said pipe casing, a plurality of spaced load-supporting projections integrally formed on said longer extensions for engagement in said holes and separate bolt means in opposite sides of said pipe casing for attaching said clamp elements to each other thereby to engage and retain said projections in load-bearing relation to said encircled pipe casing, said bolt means being arranged in bolt holes in said clamp elements and having a diameter less than the diameter of their respective bolt holes whereby said bolts are relieved of shearing stress during employment of said clamp.

References Cited in the file of this patent

UNITED STATES PATENTS

| | | |
|---|---|---|
| 751,443 | Anthes | Feb. 9, 1904 |
| 1,098,410 | Rosenfeld | June 2, 1914 |
| 1,207,483 | Bolus | Dec. 15, 1916 |
| 1,241,126 | Kidd | Sept. 25, 1917 |